US009316837B2

United States Patent
Harris

(10) Patent No.: US 9,316,837 B2
(45) Date of Patent: Apr. 19, 2016

(54) DISPLAY STAND

(71) Applicant: CHRISTIE DIGITAL SYSTEMS USA, INC., Cypress, CA (US)

(72) Inventor: Gordon Harris, Fergus (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 253 days.

(21) Appl. No.: 14/258,812

(22) Filed: Apr. 22, 2014

(65) Prior Publication Data

US 2015/0301339 A1  Oct. 22, 2015

(51) Int. Cl.
*G02B 27/22* (2006.01)
*G02B 27/02* (2006.01)
*F16M 11/20* (2006.01)
*A47B 23/00* (2006.01)
*A47B 23/06* (2006.01)
*A47B 97/00* (2006.01)
*G02B 27/30* (2006.01)
*G06T 3/60* (2006.01)
*G06F 1/16* (2006.01)

(52) U.S. Cl.
CPC ............ *G02B 27/028* (2013.01); *A47B 23/007* (2013.01); *A47B 23/06* (2013.01); *A47B 97/00* (2013.01); *F16M 11/2007* (2013.01); *G02B 27/027* (2013.01); *G02B 27/30* (2013.01); *G06F 1/1601* (2013.01); *G06T 3/602* (2013.01); *A47B 2097/005* (2013.01)

(58) Field of Classification Search
CPC .. G02B 27/028; G02B 27/30; G02B 27/2235; F16M 11/2007; A47B 23/007; A47B 97/00; G06F 1/1637; G06F 1/1626; G03B 21/28
USPC ............... 248/122.1, 469; 359/479, 629, 859, 359/871, 879; 353/10, 99
See application file for complete search history.

(56) References Cited

U.S. PATENT DOCUMENTS

| | | | | | |
|---|---|---|---|---|---|
| 2,428,649 | A | * | 10/1947 | Brown | A47C 21/003 362/144 |
| 4,188,740 | A | * | 2/1980 | Forman | G09F 19/16 248/445 |
| 4,360,836 | A | * | 11/1982 | Breck | H04N 9/3141 348/819 |
| 4,531,813 | A | * | 7/1985 | Van den Berg | A47G 1/04 359/862 |
| 5,130,856 | A | * | 7/1992 | Tichenor | G02B 27/04 359/857 |
| 5,825,563 | A | * | 10/1998 | Anand | A61B 5/0555 359/872 |
| 5,997,147 | A | * | 12/1999 | Tatoian | A47B 23/007 359/856 |
| 6,568,818 | B2 | * | 5/2003 | Holden | G09F 19/16 359/857 |
| 6,609,451 | B1 | * | 8/2003 | Inoue | F41H 11/12 324/329 |
| 7,001,033 | B1 | * | 2/2006 | Olsen | G02B 27/028 359/629 |
| 7,016,116 | B2 | * | 3/2006 | Dolgoff | G02B 27/2278 348/E13.042 |
| 7,227,510 | B2 | * | 6/2007 | Mayer, III | G06F 3/1446 345/1.1 |
| 2013/0077163 | A1 | * | 3/2013 | Shoji | G02B 27/2235 359/479 |

FOREIGN PATENT DOCUMENTS

WO  8805553  7/1988
WO  2004099842 A1  11/2004

* cited by examiner

*Primary Examiner* — Todd M Epps
(74) *Attorney, Agent, or Firm* — Perry + Currier, Inc.

(57) ABSTRACT

A display stand is provided, the display stand comprising: a frame; a display holder attached to the frame, the display holder configured to hold a display in a substantially downward facing position; and, a mirror holder attached to the frame, the mirror holder located under the display holder, the minor holder configured to hold a mirror in a substantially upward facing position below the display and tilted at an angle thereto.

20 Claims, 5 Drawing Sheets

DISPLAY STAND

FIELD

The specification relates generally to ergonomics, and specifically to a display stand that reduces the effects of presbyopia and fatigue from close work at computers.

BACKGROUND

As people age beyond 40-50 years of age the elasticity of the eye lens declines and the ability to focus on objects and/or images near to the eye degrades. This effect is called presbyopia and the most common solution is to wear reading glasses when viewing objects and/or images that are near to the eye. However, it is a nuisance to be constantly switching glasses or removing them for near vs. far work. While bifocals and/or transition lenses can be used, these are expensive and have to be changed as a user's optical prescription changes. Furthermore, reading glasses, bifocals and the like are not always workable with computer displays as computer displays can be located at a distance "in between" near and far (e.g. a foot or more away, but less than three to four feet). Indeed, close work to a computer display requires both eyes to converge and accommodate to a near focus distance quite close to the user, perhaps as close as 15-20" or less. To focus close, the lens inside a human eye becomes more spherical (e.g. much like a clenched fist). Ciliary and other muscles also bend the two separate eyes in to achieve proper vergence when viewing near objects, which requires muscular effort, and can fatigue users after many hours. Furthermore, a user with presbyopia may not only need to wear reading glasses and the like, but also adjust a position of their head to read a computer screen, which can also lead to neck and/or back pain.

SUMMARY

In general, this disclosure is directed to a display stand that holds a display in a downward facing position and further holds a mirror in a substantially upward facing position under the display, tilted at an angle to the display so that images from the display are reflected towards a user. In some implementations, the mirror comprises a collimating mirror. Firstly, the arrangement between the display and the mirror increases the effective focal distance by a user to the display as the mirror provides a folded optical path between the user and the display. Secondly, collimation of the images effectively places the images near infinity as seen by the user. These two effects obviate the user focussing on images which are near to the user. The mirror can further magnify the images. The user can then view the images without the use of reading glasses and/or transitional lenses and/or bifocals. The images provided at the display are rotated and/or reversed prior to be being sent to the display. The rotation and/or reversal can be performed using software or hardware.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the specification provides a device comprising: a frame; a display holder attached to the frame, the display holder configured to hold a display in a substantially downward facing position; and, a mirror holder attached to the frame, the mirror holder located under the display holder, the mirror holder configured to hold a mirror in a substantially upward facing position below the display and tilted at an angle thereto.

The display holder can comprise a flat panel display holder, and the mirror holder can comprise a collimating mirror holder.

The device can further comprise: the display held by the display holder; and the mirror held by the mirror holder. The display can comprise a flat panel display and the mirror can comprise a collimating mirror. The mirror can be configured to magnify greater than 1×.

The display holder can be further configured to detachably hold the display.

One or more of a position, a height, and an angle of the display holder with respect to the frame can be adjustable.

The display holder can comprise one or more of a clamp, a c-clamp, a cam action clamp and an adjustable gooseneck flexible arm.

The mirror holder can be further configured to detachably hold the mirror.

One or more of a position, a height and an angle of the mirror holder with respect to the frame can be adjustable.

The mirror holder can comprise one or more of a clamp, a c-clamp, a cam action clamp and an adjustable gooseneck flexible arm.

The frame can comprise one or more of a shaft and a base.

Another aspect of the specification provides a system comprising: a display; a mirror; a frame; a display holder attached to the frame, the display holder holding the display in a substantially downward facing position; a mirror holder attached to the frame, the mirror holder located under the display holder, the mirror holder holding the mirror in a substantially upward facing position below the display and tilted at an angle thereto; and, a computing device in communication with the display, the computing device configured to provide images to the display for reflection from the mirror.

The display holder can comprise a flat panel display holder, and the mirror holder can comprise a collimating mirror holder.

The display can comprise a flat panel display and the mirror can comprise a collimating mirror.

The frame can comprise one or more of a shaft and a base.

The computing device can stores an application configured to one or more of rotate and reverse the images via image processing prior to transmitting the images to the display for reflection from the mirror.

The system can further comprise a hardware device configured to one or more of rotate and reverse the images prior to the images being displayed by the display for reflection from the mirror. The computing device can comprise the hardware device. The hardware device can be located between the display and the computing device.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
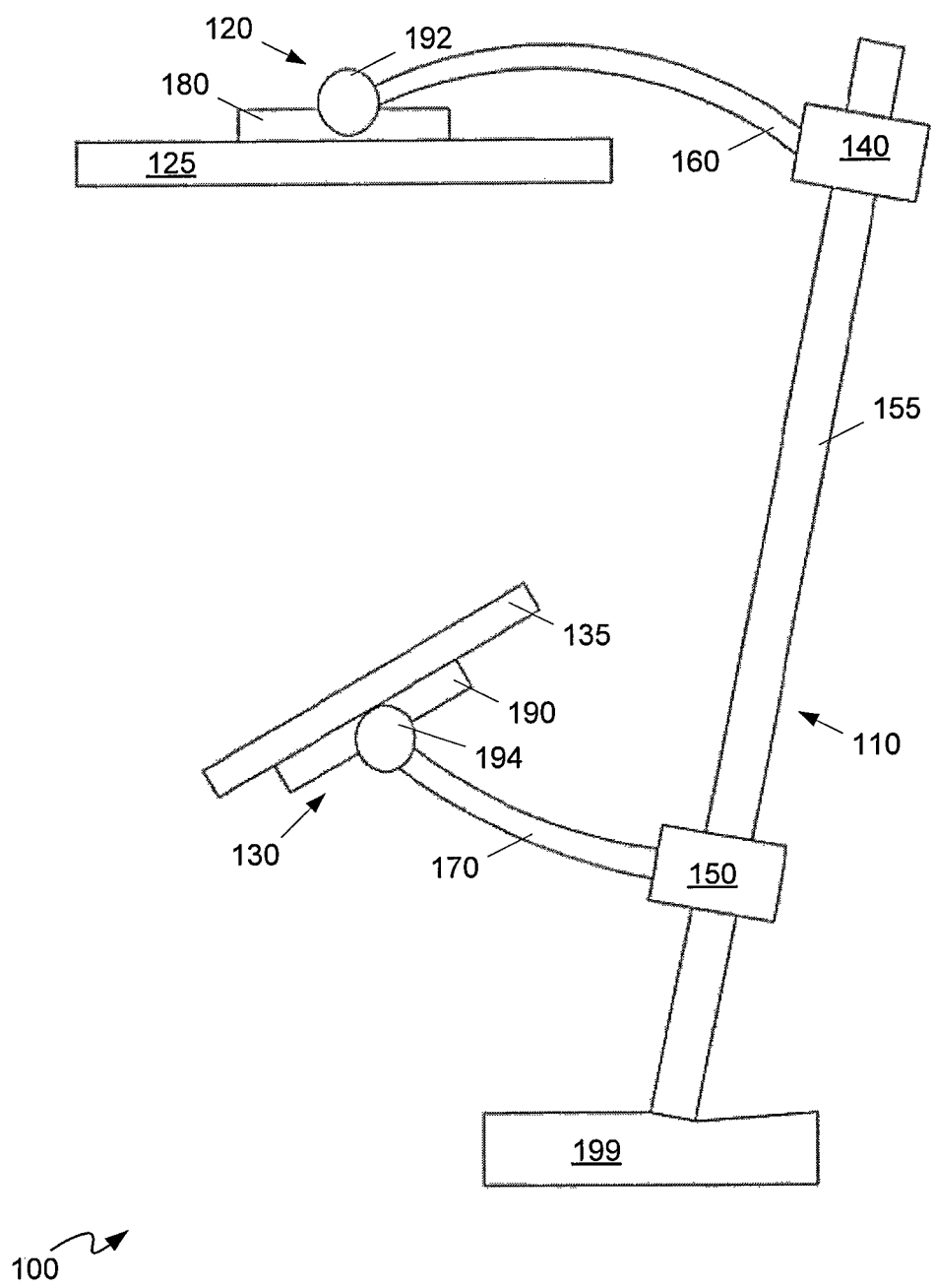
FIG. 1 depicts a display stand, according to non-limiting implementations.

Attention is directed to FIG. 1 which depicts a side view of a device 100 comprising: a frame 110; a display holder 120 attached to frame 110, display holder 120 configured to hold a display 125 in a substantially downward facing position; and, a mirror holder 130 attached to frame 110, mirror holder 130 located under display holder 120, mirror holder 130 configured to hold a mirror 135 in a substantially upward facing position below display 125 and tilted at an angle thereto. While FIG. 1 depicts device 100 further comprising display 125 held by display holder 120 and mirror 135 held by mirror holder 130, device 100 can be provided and/o sold without one or more of display 125 and mirror 135. In some implementations, mirror 135 comprises a collimating mirror configured to collimate light. In some implementations, mirror 135 is configured to magnify greater than 1×. Display 125 can comprise a flat panel display as described in further detail below.

The terms "up, "down", "upwards", "downwards", and "under" as used herein are appreciated to be relative to the earth and/or the ground when device 100 is in a use position. For example, device 100 can be shipped and/or stored in any position relative to the earth; however, display holder 120 is configured to hold a display 125 in a substantially downward facing position in a use position; and mirror holder 130 located under display holder 120 when device 100 is in the use position, and mirror holder 130 is configured to hold a mirror 135 in a substantially upward facing position below display 125 when device 100 is in a use position. In relative terms, display holder 120 and mirror holder 130 are each attached to frame 110, each configured to respectively hold display 125 and mirror 135 relative to each other so that mirror 135 is at an angle to display 125, and images from display 125 can be reflected away from frame 110. Furthermore, a use position is appreciated to be a position where device 100 is in use by a viewer so that device 100 is located on a surface and the viewer is viewing display 125 using mirror 135.

In general, device 100 holds display 125 in a substantially downward facing position, and further holds mirror 135 in a substantially upward facing position below display 125 and tilted at an angle thereto, so that images provided at display 125 are reflected towards a user, thereby increasing a length of the optical path of the images provided at display 125. However, display 125 need not face straight down; rather relative angles of display 125 to mirror 135 can be configured for different viewers, different types of viewers, different heights of viewers and the like. Specifically, a normal of display 125 need not be at an angle of 0° to the earth when device 100 is in a use position; rather, a normal of display 125 can be between about +10° and about −10° to the earth when device 100 is in a use position. However, other angles are within the scope of present implementations. Similarly, mirror 135 does not face straight up; rather relative angles of display 125 to mirror 135 can be configured for different viewers, different types of viewers, different heights of viewers and the like. Specifically, a normal of mirror 135 is at an angle to a normal of display 125 so that images provided at display 125 are reflected by mirror 135 away from frame 110, for example towards a user. When mirror 135 comprises a collimating mirror, mirror 135 collimates the images so that the images appear at infinity. Mirror 135 can optionally magnify the images. All three effects, and/or a combination thereof, contribute towards relief of presbyopia of a viewer viewing the images via mirror 135.

Display 125 can comprise any suitable one of, or combination of, flat panel displays (e.g. LCD (liquid crystal display), plasma displays, OLED (organic light emitting diode) displays, capacitive or resistive touchscreens, CRTs (cathode ray tubes) and the like). However, in particular non-limiting implementations, display 125 comprise a flat panel display, and display holder 120 comprises a flat panel display holder.

Mirror 135 can comprise any suitable one of, or combination of, a flat mirror, a collimating mirror, a magnifying mirror, and the like. However, in particular non-limiting implementations, mirror 135 comprise a collimating mirror, and mirror holder 130 comprises a collimating mirror holder.

Mirror 135 can be flat, parabolic or spherical. Use of a flat mirror results in images at display 125 being located along an optical path that is longer than when viewing display 125 in a normal upright position; however, in some instances, the image at display 125 can be too small to read text since the image is not magnified, nor does a flat mirror collimate the light towards infinity for optimal eye relaxation. Hence, a spherical or parabolic mirror can be used to one or more of magnify the image and collimate the image. Hence mirror 135 can include, but is not limited to a parabolic mirror, a spherical mirror, and free form aspheric mirrors; such mirrors can comprise either glass mirrors or plastic mirrors (e.g. fabricated with CNC (computer numerical control) techniques and or molding techniques).

A successful prototype included an about 8" diameter, about 2400 mm spherical radius, and about f/6 telescope spherical mirror. Another successful prototype included a 17" diameter, about 2127 mm spherical radius and about f/2.5 spherical mirror. However, mirrors with other diameters, other spherical radii and other f-number values are within the scope of present implementations including, but not limited to mirrors with spherical radii in a range of about 1400 mm to about 2600 mm; however, the optical and physical properties of mirror 135 can be customized for a given viewer, and/or for given degrees of presbyopia. In general, a mirror 135 can be selected that is of a size that does not hit and/or interfere with frame 110 (e.g. including a shaft 155, described below). In yet further implementations, a size of mirror 135 can be selected that is compatible with display 125 and/or frame 110, for example, mirrors of less than or equal to about 17 inches in diameter can be used for frames that support about a 17 inch to 24 inch display, however, other sizes of frames and mirrors are within the scope of present implementations. Furthermore, f-numbers of mirror 135 can be chosen that are slower than about f/1, though other sizes of f-number of mirror 135 are within the scope of present implementations.

Testing of the first successful prototype allowed a user free head movement without image swimming and gave good and comfortable image quality to both eyes for users over a range of ages, even when not suffering from presbyopia; even younger viewers felt the decreased focus and vergence effort of their eyes when viewing images using device 100, and especially when mirror 135 comprises a collimating mirror. In other words, a collimating mirror places an image viewed in mirror 135 at about virtual infinity, which decreases vergence and accommodation efforts of eyes of users when focusing on the images.

In some implementations, display holder 120 is further configured to detachably hold display 125 so that device 100 can be sold without display 125; alternatively, device 100 can be sold with display 125 already attached; display 125 can be either permanently attached or removably attached and/or removable using special tools available to a technician and/or an employee of an entity that sells and/or services device 100.

Similarly, in some implementations, mirror holder 130 is further configured to detachably hold mirror 135 so that device 100 can be sold without mirror 135; alternatively, device 100 can be sold with mirror 135 already attached; mirror 135 can be either permanently attached or removably attached and/or removable using special tools available to a technician and/or an employee of an entity that sells and/or services device 100.

In some implementations, mirror 135 is interchangeable with other mirrors having different optical properties and/or sizes. For example, mirror 135 can have a first magnification and a second mirror (not depicted) can have a second magnification, different from the first magnification, the second mirror being otherwise similar to mirror 135. Hence, as a user of device 100 ages and/or their degree of presbyopia changes, mirror 135 can be replaced with a mirror of a higher magnification.

Similarly, display 125 can be interchangeable with other displays so that display 125 can be replaced is it fails and/or is damaged and/or when a larger or smaller display is preferred by a user. Changing display 125 to a larger or smaller display can occur in conjunction with changing mirror 135 to a correspondingly larger or smaller mirror so that an area of the new display is viewable in the new mirror. In other words, mirror 135 is generally configured to reflect a substantial viewing area and/or all of the viewing area of display 125 towards a user of device 100.

In some implementations, a position of one or more of display 125 and mirror 135 can be fixed based, for example, on average viewing positions of users as determined, for example, heuristically and/or from ergonomic studies of people using device 100.

Alternatively, one or more of a position, a height, and an angle of display holder 120 and/or mirror holder 130 with respect to frame 110 can be adjustable. In other words, position, height and/or angle of each of display 125 and mirror 135 can be adjusted by a viewer; in particular, the angles of each can be changed by viewer to be greater or less by adjusting display angle or mirror angle or both; the display need not face straight down. For example, one or more of display holder 120 and mirror holder 130 can comprise one or more of a clamp, a c-clamp, a cam action clamp, and an adjustable gooseneck flexible arm. As depicted, each of display holder 120 and/or mirror holder 130 comprises a respective clamp 140, 150 which respectively clamp display holder 120 and mirror holder 130 to frame 110 and whose height on frame 110 are adjustable. For example, as depicted, frame 110 comprises a shaft 155 which can comprise one or more of a tube, a pipe, a dowel, and the like, of any suitable cross-sectional shape, including but not limited to a circular cross-section, an I-beam cross-section, a triangular cross-section, a round cross-section, a square cross-section, a rectangular cross-section and/or a tapered cross-section, and each of clamps 140, 150 both respectively clamp display holder 120 and mirror holder 130 to shaft 155 and enable a height of display holder 120 and mirror holder 130 to be adjusted. For example, each of clamps 140, 150 can be attached to frame 110, and slide up and down shaft 155, being lockable into a respective position and/or respective height that places display 125 and mirror 135 at respective positions that are comfortable for a viewer.

Similarly, as depicted, each of display holder 120 and mirror holder 130 comprises a respective gooseneck flexible arm 160, 170 respectively attached to clamps 140, 150. Gooseneck flexible arms 160, 170 enable angles of each of display holder 120 and mirror holder 130 to be adjusted with respect to frame 110. For example, a user can adjust both a height of each of display 125 and mirror 135, and an angle of each of display 125 and mirror 135. Alternatively, an angle of display holder 120 and hence display 125 can be fixed so that that display 125 always faces substantially downwards at about 0° normal to the ground, while an angle of mirror holder 130, and hence mirror 135, is adjustable with respect to frame 110 and/or display holder 120 and/or a user.

As depicted, each of gooseneck flexible arms 160, 170 are attached to respective brackets 180, 190 for respectively holding display 125 and mirror 135 using respective ball and socket joints 192, 194 to provide further flexibility in adjusting angles of display 125 and mirror 135.

Further, while in depicted implementations, each of display holder 120 and mirror holder 130 comprises a respective clamp 140, 150, and respective gooseneck flexible arms 160, 170, and respective ball and socket joints 192, 194, in other implementations, each of display holder 120 and mirror holder 130 can comprise other apparatus for adjusting height and/or angle of display 125 and mirror 135. In other words, while gooseneck flexible arms, ball and socket joints and clamps are depicted herein, any apparatus for adjusting height and angle of one or more of display 125 and mirror 135 are within the scope of present implementations. For example, in other implementations, one or more of display holder 120 and mirror holder 130 can comprise a respective arm attached to frame 110 using a ball and socket joint and/or an adjustable joint that both changes a height and an angle of display 125 and/or mirror 135; such arms can further be respectively attached to brackets 180, 190 using a ball and socket joint and/or an adjustable joint that provides yet further apparatus for changing a height and an angle of display 125 and/or mirror 135.

In general, adjustability of positions of components of device 100 can be provided which accommodate a range of body sizes from a "large" 99 percentile man to a "small" 1 percentile man and/or a "large" 99 percentile woman to a "small" 1 percentile woman, including, but not limited to adult males ranging from about 28.6" sitting eye height to about 34.6" sitting eye height, and adult females ranging from about 26.3" sitting eye height to about 32.7" sitting eye height.

Hence, for example, in some implementations, clamps 140, 150 and frame 110 can be configured so that each of clamps 140, 150 (and hence display holder 120 and mirror holder 130) can slide about 8" up and down frame 110.

As depicted, frame 110 comprises shaft 155 and a base 199, shaft 155 connected to base 199. Base 199 is generally configured to support device 100 on a surface, when display 125 and mirror 135 are attached thereto. Base 199 can hence comprise one or more weights for preventing device 100 from tipping when display 125 and mirror 135 are attached thereto. As depicted, shaft 155 extends at about a 30° angle from base 199. In some implementations, an angle of shaft 155 with respect to base 199 can be adjustable; for example, in these implementations, shaft 155 can be joined to base 199 via one or more of a ball and socket joint and an adjustable joint.

However, in other implementations, frame 110 can be attachable and/or clamped to a surface; hence, in place of base 199, frame 110 can comprise a clamp and/or apparatus for attaching frame 110 to a surface. In some implementations, a surface can be adapted to accept frame 110 therein; for example, a surface (such as a desk) can comprise a complimentary aperture and/or a complimentary hole configured to accept shaft 155 so that weight and stress from the device 100 is distributed through the surface to support device 100.

Furthermore, in other implementations, frame 110 need not comprise shaft 155 and base 199 as depicted; rather frame 110 can be of any shape where display holder 125 and mirror holder 135 are attachable there to, and/or adjustable relative to frame 110.

Hence, device 100 can provide adjustment of both mirror 135 to a viewer position and display 125 to mirror 135 position so that so that viewers with presbyopia can adapt apparent viewing distance and/or an optical path from their eyes to display 125 to just far away enough to maintain good focus without reading glasses—this way they can work comfortably glasses free.

Figure 2:
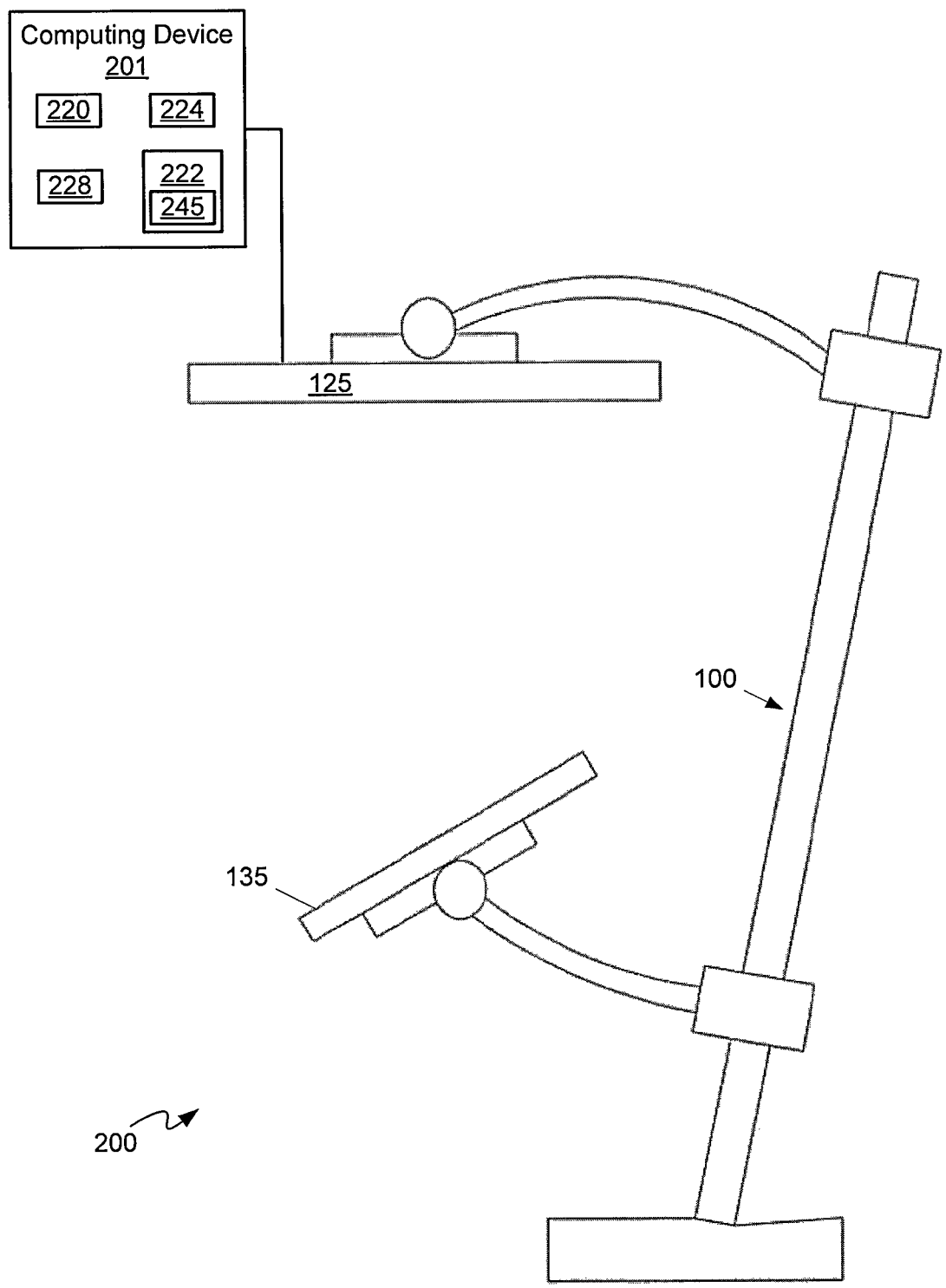
FIG. 2 depicts a display, being held by the display stand of FIG. 1, in communication with a computing device for rotating and/or reversing images to be provided at the display, according to non-limiting implementations.

In general, as mirror 135 reflects images from display 125 towards a user, images are one or more of reversed and rotated prior to being provided at display 125. Hence, attention is next directed to FIG. 2, which depicts a system 200 comprising: device 100, display 125, mirror 135 and a computing device 201 in communication with display 125, computing device 201 configured to provide images to display 125 for reflection from mirror 135. Computing device 201 generally comprises a processor 220 interconnected with a memory 222, a communication interface 224 (interchangeably referred to as interface 224) and one or more input device 228 (e.g. a keyboard, a keypad, a pointing device, a mouse, a track wheel, a trackball, a touchpad, a touch screen and the like, which can be incorporated into computing device 201 and/or a external to computing device 201). Computing device 201 generally stores, at memory 222 an application 245 configured to one or more of rotate and reverse the images via image processing prior to transmitting the images to display 125, via interface 224, for reflection from mirror 135. For example, while not depicted, computing device 201 can also generally store, at memory 222, images and/or applications for generating images, which are rotated and/or reversed before being transmitted to display 125.

Processor 220 (which can be implemented as a plurality of processors, can include but is not limited to one or more central processors (CPUs)). Processor 220 is configured to communicate with memory 222 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 222 and used by processor 220 which makes appropriate utilization of volatile storage during the execution of such programming instructions. Those skilled in the art will now recognize that memory 222 is an example of computer readable media that can store programming instructions executable on processor 220. Furthermore, memory 222 is also an example of a memory unit and/or memory module.

Memory 222 further stores application 245 that, when processed by processor 220, enables processor 220 to: rotate and/or reverse images via image processing prior to transmitting the images to display 125 for reflection from mirror 135. Processor 220 can, in some implementations, comprise an image processor.

Furthermore, memory 222 storing application 245 is an example of a computer program product, comprising a non-transitory computer usable medium having a computer readable program code adapted to be executed to implement a method, for example a method stored in application 245.

Interface 224 which can be implemented as one or more radios and/or connectors and/or network adaptors and/or transceivers, configured to wired and/or wirelessly communicate with display 125. Interface 224 can include, but is not limited to, any suitable combination of USB (universal serial bus) cables, serial cables, wireless links, Bluetooth links, NFC (near field communication) links, WLAN (wireless local area network) links, WiFi links, WiMax links, access points, and the like, and/or a combination.

Figure 3:
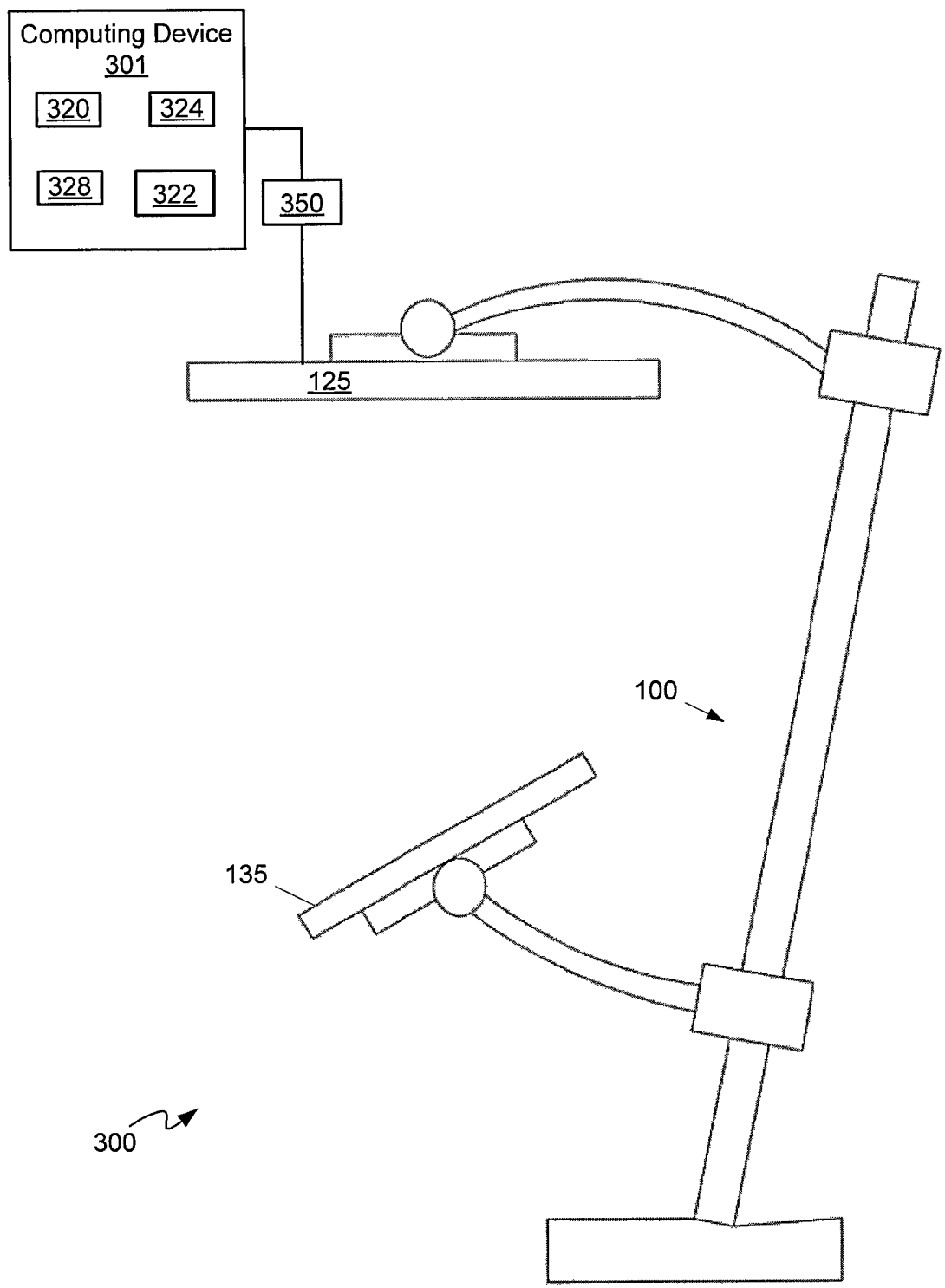
FIG. 3 depicts a display, being held by the display stand of FIG. 1, in communication with a computing device and hardware device for rotating and/or reversing images to be provided at the display, according to non-limiting implementations.

Computing device 201 can include, but is not limited to, any suitable combination of electronic devices, communications devices, computing devices, personal computers, servers, laptop computers, portable electronic devices, mobile computing devices, portable computing devices, tablet computing devices, laptop computing devices, internet-enabled appliances, entertainment devices, video playing devices and the like. Other suitable devices are within the scope of present implementations Attention is next directed to FIG. 3, which depicts a system 300 comprising: device 100, display 125, mirror 135 and a computing device 301 in communication with display 125, computing device 301 configured to provide images to display 125 for reflection from mirror 135. Computing device 301 is similar to computing device 201 with like elements having like numbers preceded by a "3" rather than a "2". Hence computing device 3-1 generally comprises a processor 320 interconnected with a memory 322, a communication interface 324 (interchangeably referred to as interface 324) and one or more input device 328. Hence, system 300 is similar to system 200; however, in contrast to system 200, system 300 comprises a hardware device 350 configured to one or more of rotate and reverse images prior to the images being displayed by display 125 for reflection from mirror 135. In other words, hardware device 350 comprises image processing components that rotate and/or reverse images being transmitted from computing device 301 and display 125.

As depicted, hardware device 350 is located between display 125 and computing device 301, however, in other implementations, computing device 301 comprises hardware device 350, for example as an additional image processor at computing device 301.

Furthermore, image processing at one or more of computing device 201 and hardware device 350 can be performed in one or more of a video card GPU (graphics processing unit) via image flipping software and/or in a frame buffer plus processing chip. Application 245 can further be processed with modified video drivers at computing device 201 to minimize latency.

Figure 4:
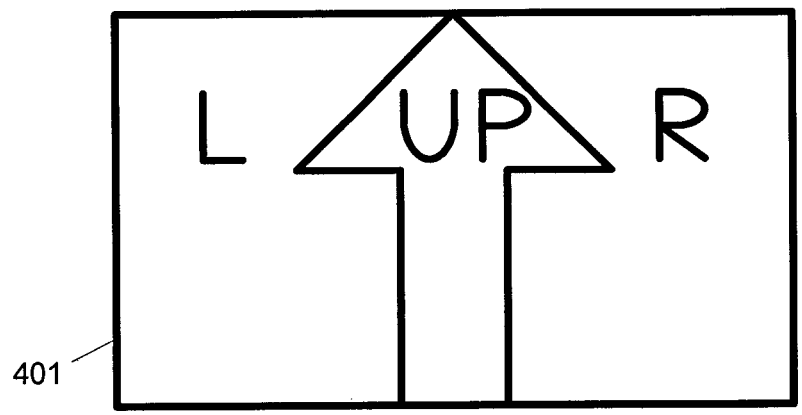
FIG. 4 depicts rotating and/or reversing of images to be provided at a display being held by the display stand of FIG. 1, according to non-limiting implementations.
Figure 4:
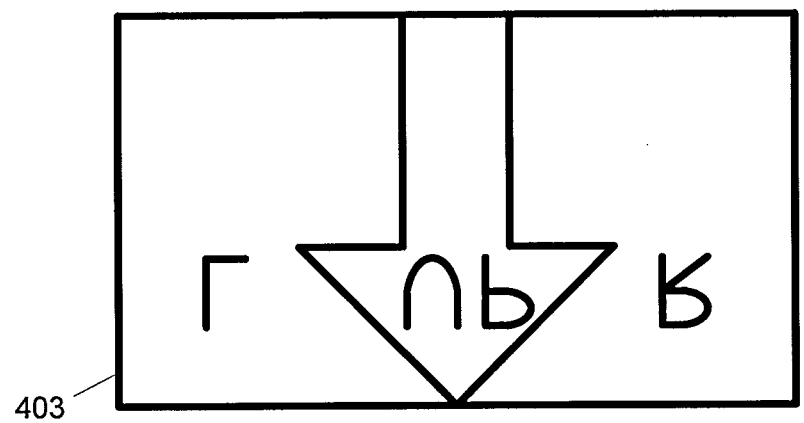

Attention is next directed to FIG. 4, which depicts an example image 401 to be viewed at mirror 135; indeed, an image stored at one or more of computing devices 201, 301 can be similar to image 401; however, image 401 is provide at display 125 as image 403 which is a mirror image of image 401 through a line running along a bottom of image 401. Image 403 is produced by processor 220 processing application 245 in conjunction with image 401 and/or by hardware device 350. In general, x axis pixel locations (e.g. left to right in FIG. 4) in each of images 401, 403 are similar, but y axis pixel locations (e.g. top to bottom in FIG. 4) are reversed top to bottom such that "up" in image 401 is at "bottom" in image 403. For example, in FIG. 4, the "L" is on the left in both images 401, 403, but the "L" in image 403 is a mirror image of the "L" in image 401, through a line running along the bottom of image 401.

Figure 5:
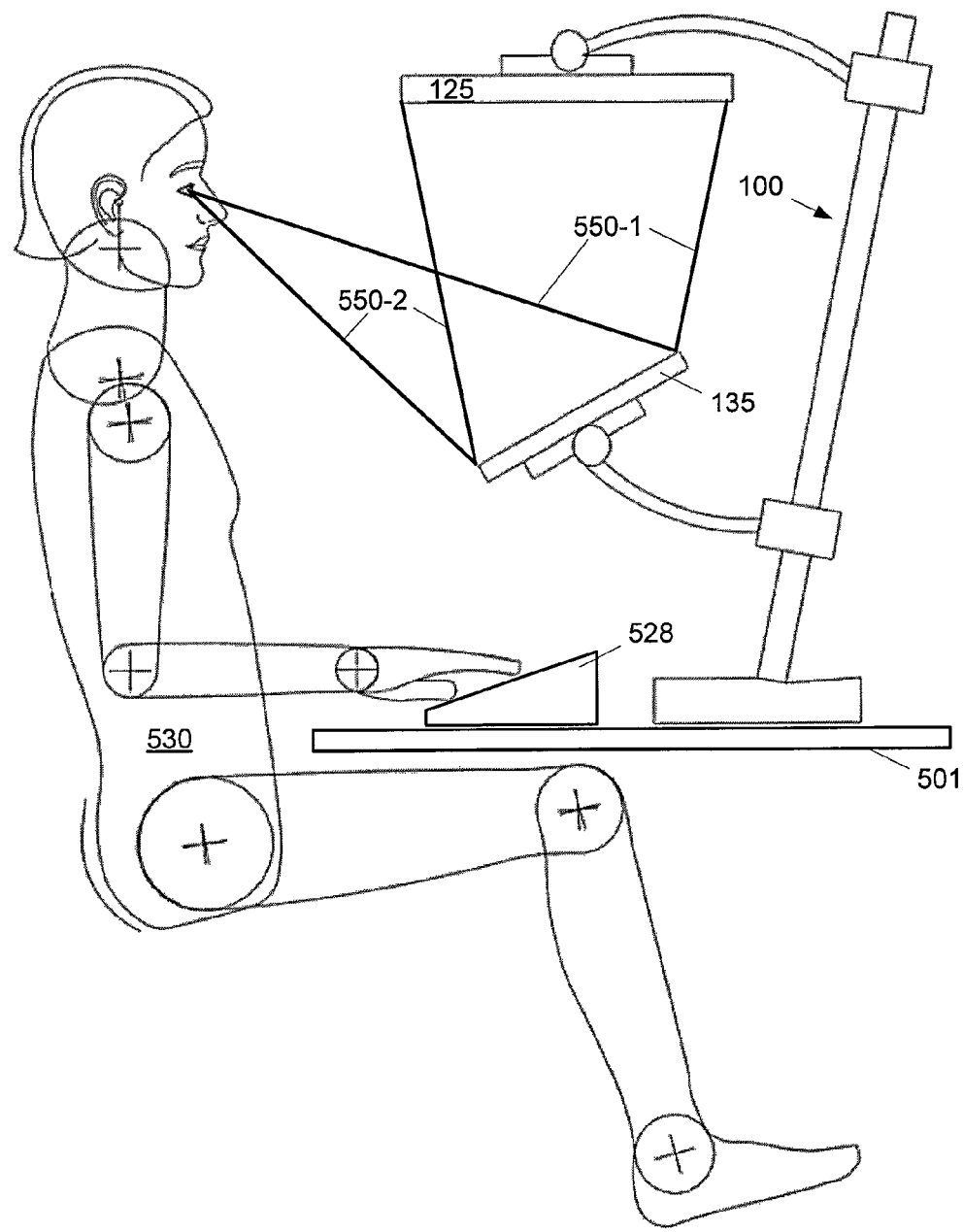
FIG. 5 depicts a user viewing images at a display being held by the display stand of FIG. 1, via mirror being held by the display stand of FIG. 1, according to non-limiting implementations.

Hence, computing device 201 and/or hardware device 350 are configured to intercept a "normal" video signal from computing device 201 and/or computing device 301 to digitally flip the image to allow for an approximately 45 degree fold in the optical path, top to bottom, and mirror inversion by mirror 135. The fold in the optical path from top to bottom is further shown in FIG. 5, which depicts device 100, including display 125 and mirror 135, on a surface 501, along with a keyboard 528 (e.g. an input device 228, 328), and a user 530. Also depicted are optical paths 550-1, 550-2 from a "bottom" and "top" of display 125 to mirror 135, and to an eye of user 530. In general, in mirror 135, user 530 views an edge of an image at display 125 that is furthest away from user 530 (e.g. the "bottom" of display 125) as the top of the image, and an edge of the image at display 125 that is closest to user 530 (e.g. the "top" of display 125) as the bottom of the image. Hence, the inversion in FIG. 4.

Persons skilled in the art will appreciate that there are yet more alternative implementations and modifications possible, and that the above examples are only illustrations of one or more implementations. For example, in some implementations, devices 100 can be adapted to include touch device hardware and/or multi touch overlay hardware and/or a 2D (two dimensional) and/or 3D (three dimensional) tracking hardware with mirror 135, the touch and/or tracking hardware in communication with one or more of computing devices 201, 301 as an alternative input device.

In yet further implementations, device 100 can be adapted to include 3D autostereo capability (i.e. display 125 could comprise a 3D display) to decrease the conflict between vergence and accommodation of eyes; for example, 3D properties of images at display 125 could be adapted based on virtual locations of features in images: when the features are located at infinity and/or above a threshold distance, left eye and right eye images can be the same until features located closer are provided in the images. Further autostereo schemes are described in co-pending U.S. application Ser. No. 13/297814, incorporated herein by reference.

In yet further implementations, mirror 135 can comprise a bendable and/or variable mirror, for example, a Mylar mirror with differing air pressure/vacuum hardware to change a shape thereof and hence change a focal length and the like of mirror 135. In yet further implementations, such mirrors can include one or more actuators and/or mechanisms for distorting the mirrors.

Provided herein is a display stand that holds a display and mirror relative to each other so that the optical path between the display and mirror is folded, so that the mirror can be positioned to reflect the display to the user, the display being located above the mirror and facing substantially down. This increases the effective optical path between a viewer and the display compared to, for example, a display at a laptop or a personal computer; indeed, the optical path can be about doubled and/or almost doubled. This assists viewers with presbyopia, for example older viewers; indeed, a successful prototype tested on viewers with presbyopia allowed the viewers to work comfortably on a computer without reading glasses. Use of a collimating mirror causes images from the display to be collimated so that the image is located close to and/or at infinity, so that accommodation (near focus) of the eye is minimized and/or obviated. The result is that parallel ray bundles of the collimated images can make viewing images at the display almost as comfortable as looking out a window at infinity, as eye muscles can relax. It is similar to how relaxed eyes can feel when sleeping or just staring blankly with no effort. The net result is that a smaller high density display can "look" bigger and also be more comfortable to watch for hours on end. Use of a magnifying mirror further magnifies the images at the display: hence, even though the optical path is longer the image size can be quite similar to a display viewed without a mirror.

Further, the mirror used with the display stand can be customized for different degrees of presbyopia; further positions of the display and the mirror relative to each other, and/or a viewer. Such customization contributes obviates a need for reading glasses by a combination of adjusting the focal length and the viewing geometry: adjusting positions of the mirror and the display can position an image far enough away to be in sharp focus for a presbyopic viewer and also to magnify the image and control the field of view to get the back to a preferred size.

Those skilled in the art will appreciate that in some implementations, the functionality of computing devices 201, 301, and hardware device 350 can be implemented using preprogrammed hardware or firmware elements (e.g., application specific integrated circuits (ASICs), electrically erasable programmable read-only memories (EEPROMs), etc.), or other related components. In other implementations, the functionality of computing devices 201, 301, and hardware device 350 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., radio-frequency, microwave, infrared, free-space optical or other transmission schemes) or a combination thereof Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
   a frame;
   a display holder attached to the frame, the display holder configured to hold a display in a substantially downward facing position; and,
   a mirror holder attached to the frame, the mirror holder located under the display holder, the mirror holder configured to hold a mirror in a substantially upward facing position below the display and tilted at an angle thereto.

2. The device of claim 1, wherein the display holder comprises a flat panel display holder, and the mirror holder comprises a collimating mirror holder.

3. The device of claim 1, further comprising: the display held by the display holder; and the mirror held by the mirror holder.

4. The device of claim 3, wherein the display comprises a flat panel display and the mirror comprises a collimating mirror.

5. The device of claim 3, wherein the mirror is configured to magnify greater than 1×.

6. The device of claim 1, wherein the display holder is further configured to detachably hold the display.

7. The device of claim 1, wherein one or more of a position, a height, and an angle of the display holder with respect to the frame is adjustable.

8. The device of claim 1, wherein the display holder comprises one or more of a clamp, a c-clamp, a cam action clamp and an adjustable gooseneck flexible arm.

9. The device of claim 1, wherein the mirror holder is further configured to detachably hold the mirror.

10. The device of claim 1, wherein one or more of a position, a height and an angle of the mirror holder with respect to the frame is adjustable.

11. The device of claim 1, wherein the mirror holder comprises one or more of a clamp, a c-clamp and an adjustable gooseneck flexible arm.

12. The device of claim 1, wherein the frame comprises one or more of a shaft and a base.

13. A system comprising:
   a display;
   a mirror;
   a frame;
   a display holder attached to the frame, the display holder holding the display in a substantially downward facing position;
   a mirror holder attached to the frame, the mirror holder located under the display holder, the mirror holder holding the mirror in a substantially upward facing position below the display and tilted at an angle thereto; and,
   a computing device in communication with the display, the computing device configured to provide images to the display for reflection from the mirror.

14. The system of claim 13, wherein the display holder comprises a flat panel display holder, and the mirror holder comprises a collimating mirror holder.

15. The system of claim 13, wherein the display comprises a flat panel display and the mirror comprises a collimating mirror.

16. The system of claim 13, wherein the frame comprises one or more of a shaft and a base.

17. The system of claim 13, wherein the computing device stores an application configured to one or more of rotate and reverse the images via image processing prior to transmitting the images to the display for reflection from the mirror.

18. The system of claim 13, further comprising a hardware device configured to one or more of rotate and reverse the images prior to the images being displayed by the display for reflection from the mirror.

19. The system of claim 18, wherein the computing device comprises the hardware device.

20. The system of claim 18, wherein the hardware device is located between the display and the computing device.

* * * * *